(12) United States Patent
Rhee et al.

(10) Patent No.: US 10,859,847 B2
(45) Date of Patent: Dec. 8, 2020

(54) APERTURE MODULE AND CAMERA MODULE INCLUDING THE SAME

(71) Applicant: SAMSUNG ELECTRO-MECHANICS CO., LTD., Suwon-si (KR)

(72) Inventors: Dong Woo Rhee, Suwon-si (KR); Min Gyu Kim, Suwon-si (KR); Sang Hyuk Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/449,779

(22) Filed: Jun. 24, 2019

(65) Prior Publication Data
US 2020/0050013 A1 Feb. 13, 2020

(30) Foreign Application Priority Data
Aug. 13, 2018 (KR) .................. 10-2018-0094277

(51) Int. Cl.
*G03B 5/00* (2006.01)
*G02B 27/64* (2006.01)
*G02B 13/00* (2006.01)

(52) U.S. Cl.
CPC ....... *G02B 27/646* (2013.01); *G02B 13/0015* (2013.01); *G03B 5/00* (2013.01)

(58) Field of Classification Search
USPC ......................................................... 396/63
See application file for complete search history.

(56) References Cited

U.S. PATENT DOCUMENTS

| 7,480,109 B1 * | 1/2009 | Hu ................... G02B 7/102 310/317 |
| 7,551,368 B2 * | 6/2009 | Chen .................. G02B 3/12 359/665 |

(Continued)

FOREIGN PATENT DOCUMENTS

| JP | 5142558 B2 | 11/2012 |
| JP | 2013-160812 A | 8/2013 |

(Continued)

OTHER PUBLICATIONS

Korean Office Action dated Mar. 19, 2020 in corresponding Korean Patent Application No. 10-2018-0094277 (7 pages in English, 6 pages in Korean).

(Continued)

*Primary Examiner* — Clayton E. LaBalle
*Assistant Examiner* — Warren K Fenwick
(74) *Attorney, Agent, or Firm* — NSIP Law (57) ABSTRACT

A camera module includes a lens barrel; an actuator driving the lens barrel in a direction perpendicular to an optical axis; and an aperture module adjusting an amount of light incident in the lens barrel. The aperture module includes an aperture coupled to the lens barrel, a magnet provided on one side of the aperture, a coil disposed opposite to the magnet, a position detector detecting a position of the magnet to generate a feedback signal, and a driver comparing an input signal indicating a target position of the magnet with the feedback signal to calculate an error value and generating a driving signal according to the calculated error value. The driver compares a current position of the lens barrel with a neutral position of the lens barrel to generate a compensation signal and compensates for one of the input signal and the feedback signal based on the compensation signal.

20 Claims, 3 Drawing Sheets

(56) References Cited

U.S. PATENT DOCUMENTS

| | | | | |
|---|---|---|---|---|
| 7,574,125 | B2 * | 8/2009 | Ho | G02B 7/102 |
| | | | | 359/694 |
| 10,509,213 | B1 * | 12/2019 | Monari | G02B 15/16 |
| 2011/0236008 | A1 * | 9/2011 | Kang | H04N 5/2257 |
| | | | | 396/133 |
| 2014/0184890 | A1 * | 7/2014 | McKinley | H04N 5/2253 |
| | | | | 348/357 |
| 2015/0316834 | A1 * | 11/2015 | McKinley | G03B 3/10 |
| | | | | 396/133 |
| 2016/0018720 | A1 * | 1/2016 | Bachar | G02B 7/09 |
| | | | | 359/824 |
| 2016/0227090 | A1 * | 8/2016 | Krey | H04N 5/23287 |
| 2016/0227119 | A1 * | 8/2016 | Krey | H04N 5/23258 |
| 2017/0357144 | A1 | 12/2017 | Kim et al. | |
| 2019/0141219 | A1 * | 5/2019 | Oh | H04N 5/2252 |
| 2019/0302572 | A1 * | 10/2019 | Chen | G03B 9/02 |
| 2020/0028996 | A1 * | 1/2020 | Feng | G02B 7/08 |

FOREIGN PATENT DOCUMENTS

| | | |
|---|---|---|
| JP | 2015-169850 A | 9/2015 |
| KR | 10-2017-0126043 A | 11/2017 |
| KR | 10-2017-0139982 A | 12/2017 |

OTHER PUBLICATIONS

Korean Office Action dated Nov. 14, 2019 in corresponding Korean Patent Application No. 10-2018-0094277 (7 pages in English, 6 pages in Korean).

* cited by examiner

FIG. 4

APERTURE MODULE AND CAMERA MODULE INCLUDING THE SAME

CROSS-REFERENCE TO RELATED APPLICATION

This application claims the benefit under 35 USC 119(a) of Korean Patent Application No. 10-2018-0094277 filed on Aug. 13, 2018 in the Korean Intellectual Property Office, the entire disclosure of which is incorporated herein by reference for all purposes.

BACKGROUND

1. Field

The following description relates to an aperture module, and a camera module including the same.

2. Description of Background

In general, portable communications terminals, such as mobile phones, PDAs, portable PCs, and the like, have become popular in transmission of image data as well as text or voice data. In response to such a trend, a camera module has been basically installed in portable communications terminals to allow image data transmission, video chatting, and the like to be performed.

Generally, a camera module may include a lens barrel having a lens therein and a housing accommodating the lens barrel therein, and may include an image sensor, converting an image of a subject into an electric signal. The camera module may employ a short-focus camera module that images subjects with a fixed focus. A camera module including an actuator capable of autofocusing (AF) adjustment has been adopted, according to technological development. In addition, such a camera module may employ an actuator for optical image stabilization (01S) in order to reduce resolution degradation caused by hand-shake.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel; an actuator driving the lens barrel in a direction perpendicular to an optical axis; and an aperture module adjusting an amount of light incident in the lens barrel. The aperture module includes an aperture coupled to the lens barrel, a magnet provided on one side of the aperture, a coil disposed opposite to the magnet, a position detector detecting a position of the magnet to generate a feedback signal, and a driver comparing an input signal indicating a target position of the magnet with the feedback signal to calculate an error value and generating a driving signal according to the calculated error value. The driver compares a current position of the lens barrel with a neutral position of the lens barrel to generate a compensation signal and compensates for one of the input signal and the feedback signal based on the compensation signal.

The driver may compare the neutral position of the lens barrel with a respective position in a first direction perpendicular to the optical axis of the lens barrel and in a second direction perpendicular to the first direction.

The compensation signal may compensate for a change in distance between the current position of the lens barrel and the neutral position of the lens barrel.

The magnet may move together in accordance with driving of the lens barrel in a direction perpendicular to the optical axis of the lens barrel.

The position detector may be fixedly disposed opposite to the magnet.

The actuator may detect the current position of the lens barrel and may provide the detected current position of the lens barrel to the driver.

The camera module may include a gyro sensor to detect the current position of the lens barrel, and the gyro sensor may provide to provide the detected current position of the lens barrel to the driver.

The camera module may include an illuminance sensor to detect external illuminance, and the illuminance sensor may generate the input signal based on the detected external illuminance.

In another general aspect, an aperture module includes an aperture coupled to a lens barrel to adjust light incident in the lens barrel; a magnet disposed on one side of the aperture; a coil disposed opposite to the magnet; a position detector to detect a position of the magnet and to generate a feedback signal; and a driver to supply a driving signal to the coil. The driver compares an input signal indicating a target position of the magnet with the feedback signal to calculate an error value, reflects a position of the lens barrel in a direction perpendicular to an optical axis to the error value, and generates the driving signal.

The driver may include a comparator to compare the input signal with the feedback signal to calculate the error value; a controller to apply a control gain to the error value to generate a control signal; a driving circuit to generate the driving signal based on the control signal; and a compensation signal generator to generate a compensation signal based on a position signal indicating a position of the lens barrel in the direction perpendicular to an optical axis. The comparator may compensate for the error value based on the compensation signal.

The controller may include a proportional-integral-derivative (PID) controller.

The driving circuit may include an H bridge circuit connected to the coil.

The H bridge circuit may include a switching element and the control signal may be provided to a gate of the switching element.

The position signal may be generated by an actuator configured to drive the lens barrel in the direction perpendicular to the optical axis.

The position signal may be provided from a gyro sensor of a camera module including the lens barrel.

The magnet may move together with driving of the lens barrel in the direction perpendicular to the optical axis, and the position detector may be fixedly disposed opposite to the magnet.

In another general aspect, a camera module includes a lens barrel having one or more lenses; an aperture coupled to the lens barrel to adjust light incident in the lens barrel; and a driver to generate a driving signal for driving the lens barrel and the aperture based on an input signal, a position signal, and a feedback signal.

The camera module may include an image processor to perform an image processing operation on an image signal generated by an image sensor and to provide the processed image signal to the driver as the input signal.

The camera module may include a coil, a magnet, and a position detector to generate the feedback signal by detecting a position of the magnet based on an electromagnetic interaction between the coil and the magnet and to output the feedback signal to the driver.

The camera module may include a sensor to generate the position signal based on position information with respect to a direction perpendicular to an optical axis of the lens barrel and to output the position signal to the driver.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

Figure 1:
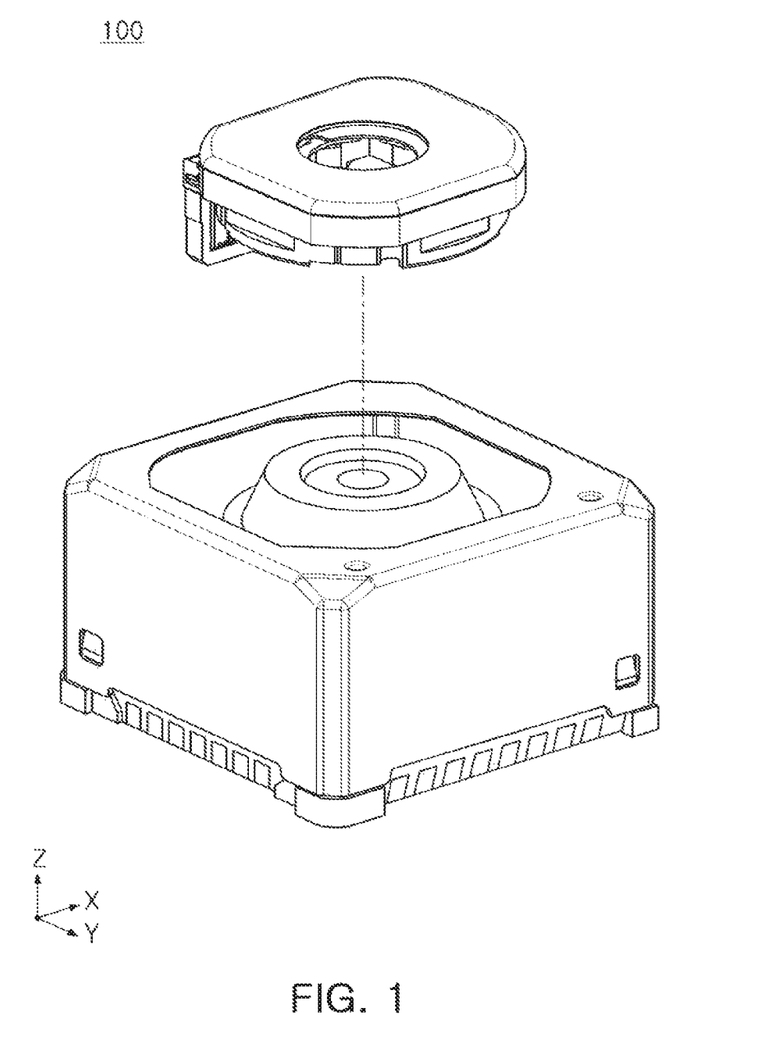
FIG. 1 is a perspective view of a camera module according to an example.
Figure 2:
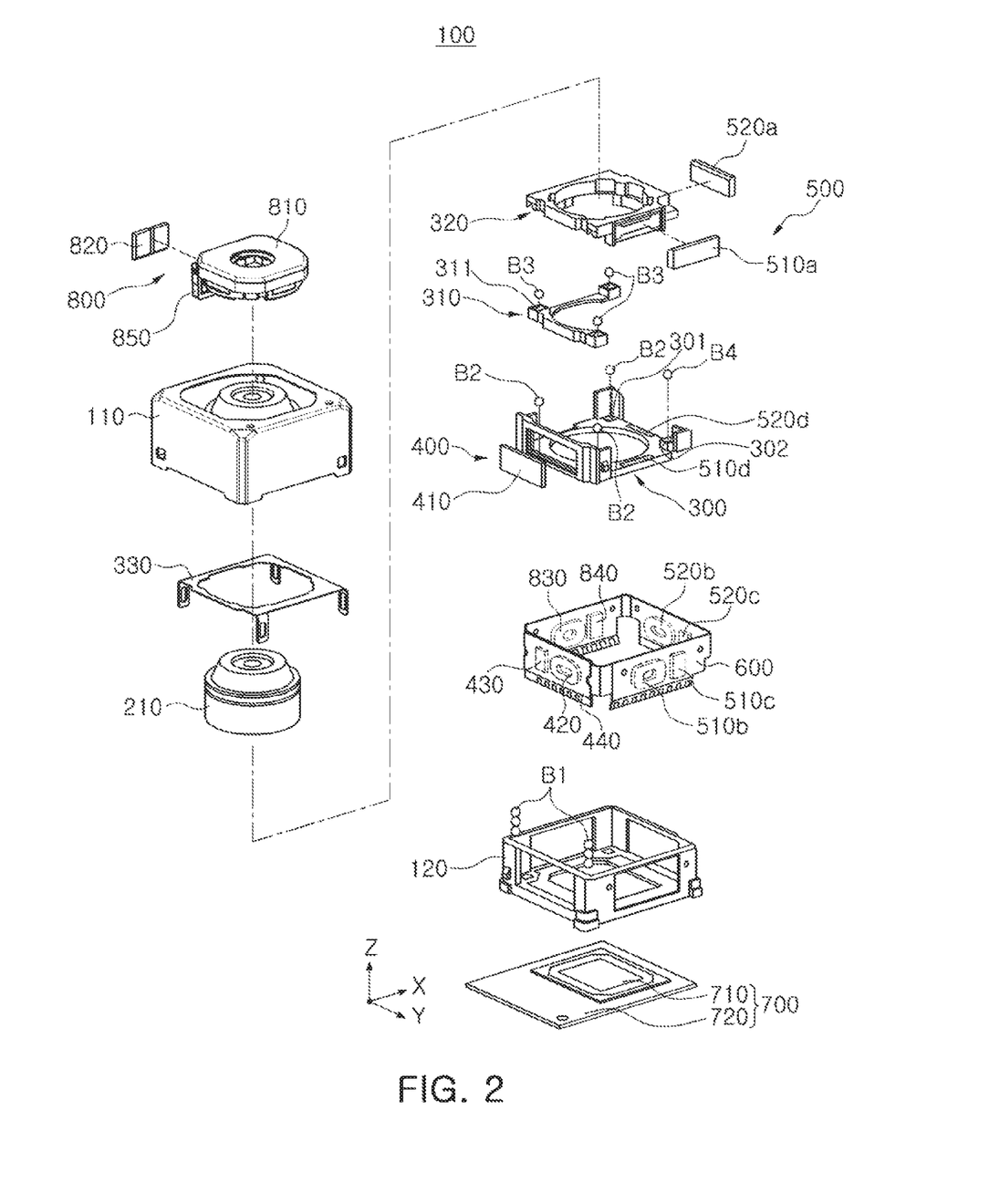
FIG. 2 is a schematic exploded perspective view of a camera module according to an example.

FIG. 1 is a perspective view of a camera module according to an example, and FIG. 2 is a schematic exploded perspective view of a camera module according to an example.

Referring to FIGS. 1 and 2, a camera module 100 may include a lens barrel 210, an actuator moving the lens barrel 210, a case 110 and a housing 120 accommodating the lens barrel 210 and the actuator, an image sensor module 700 converting light incident through the lens barrel 210 into an electric signal, and an aperture module 800 controlling an amount of light incident in the lens barrel 210.

The lens barrel 210 may have a hollow cylindrical shape such that a plurality of lenses for capturing a subject may be accommodated therein, and the plurality of lenses may be mounted on the lens barrel 210 along the optical axis. As many lenses as necessary may be disposed according to the design of the lens barrel 210, and each lens may have the same or different optical characteristics such as a refractive index.

The actuator may move the lens barrel 210. The actuator may adjust a focus by moving the lens barrel 210 in an optical axis (a Z-axis) direction, and may correct a shake at the time of capturing an image by moving the lens barrel 210 in a direction perpendicular to the optical axis (the Z-axis). The actuator may include a focus adjustment unit 400 adjusting a focus and a shake correction unit 500 correcting a shake.

The image sensor module 700 may convert light incident through the lens barrel 210 into an electric signal. The image sensor module 700 may include an image sensor 710 and a printed circuit board 720 connected to the image sensor 710, and may further include an infrared filter. The infrared filter may block light in an infrared region among light incident through the lens barrel 210. The image sensor 710 may convert light incident through the lens barrel 210 into an electric signal. The image sensor 710 may include a charge coupled device (CCD) or a complementary metal-oxide semiconductor (CMOS). The electric signal converted by the image sensor 710 may be output as an image through a display unit of a portable electronic device. The image sensor 710 may be fixed to the printed circuit board 720, and may be electrically connected to the printed circuit board 720 by wire bonding.

The lens barrel 210 and the actuator may be accommodated in the housing 120. The housing 120 may have open upper and lower portions (in the Z-axis direction), and the lens barrel 210 and the actuator may be accommodated in an inner space of the housing 120. The image sensor module 700 may be disposed in a lower portion of the housing 120.

The case 110 may be coupled to the housing 120 to surround an outer surface of the housing 120, and may protect internal components of the camera module 100. Further, the case 110 may shield electromagnetic waves. The case 110 may be made of a metal material, and may be grounded to a ground pad provided on the printed circuit board 720, thereby shielding the electromagnetic waves.

The actuator may move the lens barrel 210 to focus on a subject. The actuator may include the focus adjustment unit 400 that moves the lens barrel 210 in the optical axis (the Z-axis) direction.

The focus adjusting unit 400 may include a magnet 410 and a coil 420 generating driving force to move the lens barrel 210 and a carrier 300 accommodating the lens barrel 210 in the optical axis (the Z-axis) direction.

The magnet 410 may be mounted on the carrier 300. The magnet 410 may be mounted on a first surface of the carrier 300. The coil 420 may be mounted in the housing 120, and the coil 420 may be disposed opposite to the magnet 410. The coil 420 may be disposed on a first surface of a substrate 600, and the substrate 600 may be mounted in the housing 120.

The magnet 410 may be mounted on the carrier 300, and may move together with the carrier 300 in the optical axis (the Z-axis) direction, and the coil 420 may be fixed to the housing 120. Positions of the magnet 410 and the coil 420 may be mutually changed.

When the driving signal is applied to the coil 420, the carrier 300 may move in the optical axis (the Z-axis) direction by electromagnetic interaction between the magnet 410 and the coil 420.

The lens barrel 210 may be accommodated in the carrier 300, and the lens barrel 210 may be also moved in the optical axis (the Z-axis) direction by the movement of the carrier 300. A frame 310 and a lens holder 320 may be also accommodated in the carrier 300 such that the frame 310, the lens holder 320, and the lens barrel 210 may be also moved along the optical axis (the Z-axis) direction.

A rolling member B1 may be disposed between the carrier 300 and the housing 120 to reduce friction between the carrier 300 and the housing 120 when the carrier 300 is moved. The rolling member B1 may be in the form of a ball or a plurality of balls. The rolling member B1 may be disposed on both sides of the magnet 410.

A yoke 440 may be disposed in the housing 120. The yoke 440 may be mounted to the substrate 600, and may be disposed in the housing 120. The yoke 440 may be provided on the other surface of the substrate 600. Therefore, the yoke 440 may be disposed to face the magnet 410 with the coil 420 interposed between the yoke 440 and the magnet 410. Attractive force may act between the yoke 440 and the magnet 410 in a direction perpendicular to the optical axis (the Z-axis). The rolling member B1 may be kept in contact with the carrier 300 and the housing 120 by the attractive force between the yoke 440 and the magnet 410. Further, the yoke 440 may collect magnetic force of the magnet 410 to prevent leakage magnetic flux from being generated. The yoke 440 and the magnet 410 may form a magnetic circuit.

The example may use a closed loop control method of sensing and feeding back a position of the lens barrel 210 in the focus adjustment process. Therefore, the focus adjustment unit may include a position detector for closed loop control. The position detector may include an AF Hall sensor 430. The magnetic flux value detected by the AF Hall sensor 430 may change in accordance with movement of the magnet 410 facing the AF Hall sensor 430. The position detector may detect a position of the lens barrel 210 from the change of the magnetic flux value of the AF Hall sensor 430 in accordance with movement of the magnet 410 in the optical axis (the Z-axis) direction.

The shake correction unit 500 may be used for correcting blurring of an image or a shaking motion of a moving image due to factors such as user hand-shake or the like during an image shooting operation or a moving image shooting operation. For example, when a shake occurs during a moving image shooting operation due to user hand-shake or the like, the shake correction unit 500 may apply a relative displacement corresponding to the shake to the lens barrel 210 to compensate for the shake. The shake correction unit 500 may move the lens barrel 210 in a direction (X-axis direction or Y-axis direction) perpendicular to the optical axis (the Z-axis) to correct the shake.

The shake correction unit 500 may include a plurality of magnets 510*a* and 520*a* and a plurality of coils 510*b* and 520*b* generating driving force to move a guide member in a direction perpendicular to the optical axis (the Z-axis). The frame 310 and the lens holder 320 may be inserted into the carrier 300, and may be arranged in the optical axis (the Z-axis) direction to guide movement of the lens barrel 210. The frame 310 and the lens holder 320 may have a space into which the lens barrel 210 may be inserted. The lens barrel 210 may be inserted and fixed in the lens holder 320.

The frame 310 and the lens holder 320 may be moved in a direction perpendicular to the optical axis (the Z-axis) with respect to the carrier 300 by driving force generated by electromagnetic interaction between the magnets 510a and 520a and the coils 510b and 520b. Among the magnets 510a and 520a and the coils 510b and 520b, a first magnet 510a may be disposed on a second surface of the lens holder 320, and a first coil 510b may be disposed on a second surface of the substrate 600. The first magnet 510a and the first coil 510b may generate driving force in a first axis (a Y-axis) direction perpendicular to the optical axis (the Z-axis). Further, a second magnet 520a may be disposed on a third surface of the lens holder 320, and a second coil 520b may be disposed on a third surface of the substrate 600. The second magnet 520a and the second coil 520b may generate driving force in a second axis (an X-axis) direction perpendicular to the first axis (the Y-axis). The second axis (the X-axis) refers to an axis perpendicular to both the optical axis (the Z-axis) and the first axis (the Y-axis). The magnets 510a and 520a may be arranged to be perpendicular to each other on a plane perpendicular to the optical axis (the Z-axis).

The magnets 510a and 520a may be mounted on the lens holder 320, and the coils 510b and 520b facing the magnets 510a and 520a may be arranged on the substrate 600, and may be mounted in the housing 120.

The magnets 510a and 520a may move in a direction perpendicular to the optical axis (the Z-axis) together with the lens holder 320, and the coils 510b and 520b may be fixed to the housing 120. Positions of the magnets 510a and 520a and the coils 510b and 520b may be mutually changed.

The example may use a closed loop control method of sensing and feeding back a position of the lens barrel 210 in the shake correction process. Therefore, the shake correction unit 500 may include a position detector for closed loop control. The position detector may include OIS Hall sensors 510c and 520c. The OIS Hall sensors 510c and 520c may be arranged on the substrate 600, and may be mounted on the housing 120. The OIS Hall sensors 510c and 520c may face the magnets 510a and 520a in directions perpendicular to the optical axis (the Z-axis). For example, a first OIS Hall sensor 510c may be disposed on a second surface of the substrate 600, and a second OIS Hall sensor 520c may be disposed on a third surface of the substrate 600.

Magnetic flux values of the OIS Hall sensors 510c and 520c may change in accordance with movement of the magnets 510a and 520a facing the OIS Hall sensors 510c and 520c. The position detector may detect a position of the lens barrel 210 from a change in the magnetic flux values of the OIS Hall sensors 510c and 520c in accordance with movement in two directions (an X-axis direction and a Y-axis direction) perpendicular to the optical axes of the magnets 510a and 520a.

The camera module 100 may include a plurality of ball members supporting the shake correction unit 500. The plurality of ball members may serve to guide movement of the frame 310, the lens holder 320, and the lens barrel 210 in the shake correction process. The plurality of ball members may also function to maintain a gap between the carrier 300, the frame 310, and the lens holder 320.

The plurality of ball members may include a first ball member B2 and a second ball member B3. The first ball member B2 may guide movement of the frame 310, the lens holder 320, and the lens barrel 210 in the first axis (the Y-axis) direction, and the second ball member B3 may guide movement of the lens holder 320 and the lens barrel 210 in the second axis (the X-axis) direction.

The first ball member B2 may roll in the first axis (the Y-axis) direction when driving force is generated in the first axis (the Y-axis) direction. Therefore, the first ball member B2 may guide movement of the frame 310, the lens holder 320, and the lens barrel 210 in the first axis (the Y-axis) direction. The second ball member B3 may roll in the second axis (the X-axis) direction when driving force is generated in the second axis (the X-axis) direction. Therefore, the second ball member B3 may guide movement of the lens holder 320 and the lens barrel 210 in the second axis (the X-axis) direction.

The first ball member B2 may include a plurality of ball members arranged between the carrier 300 and the frame 310, and the second ball member B3 may include a plurality of ball members arranged between the frame 310 and the lens holder 320.

A first guide groove portion 301 accommodating the first ball member B2 may be formed on a surface of the carrier 300 on which the carrier 300 and the frame 310 face each other in the optical axis (the Z-axis) direction. The first guide groove portion 301 may include a plurality of guide grooves corresponding to the plurality of ball members of the first ball member B2. The first ball member B2 may be accommodated in the first guide groove portion 301, and may be sandwiched between the carrier 300 and the frame 310. Movement of the first ball member B2 in the optical axis (the Z-axis) direction and the second axis (the X-axis) direction may be restricted in the state of being accommodated in the first guide groove portion 301, and the first ball member B2 may move only in the first axis (the Y-axis) direction. The first ball member B2 may roll only in the first axis (the Y-axis) direction. To this end, a planar shape of each of the plurality of guide grooves in the first guide groove portion 301 may be a rectangle shape having a length in the first axis (the Y-axis) direction.

A second guide groove portion 311 accommodating the second ball member B3 may be formed on a surface of the frame 310 on which the frame 310 and the lens holder 320 face each other in the optical axis (the Z-axis) direction. The second guide groove portion 311 may include a plurality of guide grooves corresponding to the plurality of ball members of the second ball member B3.

The second ball member B3 may be accommodated in the second guide groove portion 311, and may be sandwiched between the frame 310 and the lens holder 320. Movement of the second ball member B3 in the optical axis (the Z-axis) direction and the first axis (the Y-axis) direction may be restricted in the state of being accommodated in the second guide groove portion 311, and the second ball member B3 may move only in the second axis (the X-axis) direction. The second ball member B3 may roll only in the second axis (the X-axis) direction. To this end, a planar shape of each of the plurality of guide grooves in the second guide groove portion 311 may be a rectangle shape having a length in the second axis (the X-axis) direction.

A third ball member B4 supporting movement of the lens holder 320 between the carrier 300 and the lens holder 320 may be provided. The third ball member B4 may guide both the movement of the lens holder 320 in the first axis (the Y-axis) direction and movement in the second axis (the X-axis) direction.

The third ball member B4 may roll in the first axis (the Y-axis) direction when driving force is generated in the first axis (the Y-axis) direction. Therefore, the third ball member B4 may guide movement of the lens holder 320 in the first axis (the Y-axis) direction.

The third ball member B4 may roll in the second axis (the X-axis) direction when driving force is generated in the second axis (the X-axis) direction. Therefore, the third ball member B4 may guide movement of the lens holder 320 in the second axis (the X-axis) direction. The second ball member B3 and the third ball member B4 may contact and support the lens holder 320.

A third guide groove portion 302 accommodating the third ball member B4 may be formed on a surface of the carrier 300 on which the carrier 300 and the lens holder 320 face each other in the optical axis (the Z-axis) direction. The third ball member B4 may be accommodated in the third guide groove portion 302, and may be sandwiched between the carrier 300 and the lens holder 320. Movement of the third ball member B4 in the optical axis (the Z-axis) direction may be restricted in the state of being accommodated in the third guide groove portion 302, and the third ball member B4 may move only in the first axis (the Y-axis) direction and the second axis (the X-axis) direction. To this end, a planar shape of the third guide groove portion 302 may have a circular shape. Therefore, the third guide groove portion 302, the first guide groove portion 301, and the second guide groove portion 311 may have different planar shapes.

The first ball member B2 may roll in the first axis (the Y-axis) direction, the second ball member B3 may roll in the second axis (the X-axis) direction, and the third ball member B4 may roll in the first axis (the Y-axis) direction and the second axis (the X-axis) direction. Therefore, the plurality of ball members supporting the shake correction unit 500 differ in terms of degree of freedom. Here, the degree of freedom refers to the number of independent variables required to represent a motion state of an object in a three-dimensional coordinate system. Generally, the degree of freedom of an object in a three-dimensional coordinate system may be six (6). Motion of an object may be expressed by a Cartesian coordinate system having three directions and a spherical coordinate system having three directions. In a three-dimensional coordinate system, an object may translationally move along each axis (an X-axis, a Y-axis, and a Z-axis), and may rotationally move about each axis (an X-axis, a Y-axis, and a Z-axis).

Herein, the degree of freedom refers to the number of independent variables required to represent movement of the first ball member B2, the second ball member B3, and the third ball member B4, when power is applied to the shake correction unit 500, and the shake correction unit 500 is moved by driving force generated in a direction perpendicular to the optical axis (the Z-axis). The third ball member B4 may roll along the two axes (the first axis (the Y-axis) and the second axis (the X-axis) by driving force generated in a direction perpendicular to the optical axis (the Z-axis), the first ball member B2 and the second ball member B3 may roll along one axis (the first axis (the Y-axis) or the second axis (the X-axis)). Therefore, the degree of freedom of the third ball member B4 may be greater than the degree of freedom of the first ball member B2 and the second ball member B3.

The frame 310, the lens holder 320, and the lens barrel 210 may move together in the first axis (the Y-axis) direction, when driving force is generated in the first axis (the Y-axis) direction. Here, the first ball member B2 and the third ball member B4 may roll along the first axis (the Y-axis). At this time, movement of the second ball member B3 may be restricted.

Further, the lens holder 320 and the lens barrel 210 may move in the second axis (the X-axis) direction, when driving force is generated in the second axis (the X-axis) direction. The second ball member B3 and the third ball member B4 may roll along the second axis (the X-axis). At this time, movement of the first ball member B2 may be restricted.

A plurality of yokes 510d and 520d may be provided such that the shake correction unit 500 and the first to third ball members B2, B3, and B4 maintain a contact state. The yokes 510d and 520d may be fixed to the carrier 300, and may be arranged to face the magnets 510a and 520a in the optical axis (the Z-axis) direction. Therefore, attractive force may be generated between the yokes 510d and 520d and the magnets 510a and 520a in the optical axis (the Z-axis) direction. The shake correction unit 500 may be pressed toward the yokes 510d and 520d by the attractive force between the yokes 510d and 520d and the magnets 510a and 520a. Therefore, the frame 310 of the shake correction unit 500 and the lens holder 320 may maintain contact with the first to third ball members B2, B3, and B4. The yokes 510d and 520d may be made of materials capable of generating attractive force with the magnets 510a and 520a. The yokes 510d and 520d may be provided as a magnetic body.

The yokes 510d and 520d may be provided to maintain the frame 310 and the lens holder 320 in contact with the first to third ball members B2, B3, and B4, while a stopper 330 may be provided to prevent the first to third ball members B2, B3, and B4, the frame 310, and the lens holder 320 from being released outside of the carrier 300. The stopper 330 may be coupled to the carrier 300 to cover at least a portion of an upper surface of the lens holder 320.

The aperture module 800 may include an aperture 810, a magnet 820, a coil 830, a Hall sensor 840, and a substrate 850.

The aperture 810 of the aperture module 800 may be coupled to the lens barrel 210 through an upper portion of the case 110. The aperture 810 may be mounted on the lens holder 320 to which the lens barrel 210 may be fixedly inserted, and may be coupled to the lens barrel 210. Therefore, the aperture 810 may move together with the lens barrel 210 and the lens holder 320.

The magnet 820 may be provided on one side of the aperture 810. The magnet 820 may be mounted on the substrate 850, and the substrate 850 may be provided on one side of the aperture 810, such that the magnet 820 is disposed on one side of the aperture 810. The magnet 820 may be provided on one side of the aperture 810, and may be disposed on a fourth surface of the lens holder 320. The magnet 820 may include two magnetic bodies polarized each other.

The substrate 850 may be coupled to the aperture 810 to be movable in the first axis (the Y-axis) direction. The substrate 850 may include a connection member capable of being inserted and moved in the first axis (the Y-axis) direction of the aperture 810, to be coupled to the aperture 810 such that the substrate 850 may move in the first axis (the Y-axis) direction. A diameter of an incidence hole in the upper portion of the aperture 810 may vary depending on the degree of insertion of the connection member of the substrate 850, for example, depending on a distance between the substrate 850 and the aperture 810 in the first axis (the Y-axis) direction, such that an amount of light transmitted through the aperture 810 may be determined.

The coil 830 may be disposed on a fourth side of the substrate 600 to face the magnet 820. The coil 830 may be disposed on the fourth surface of the substrate 600 such that the magnet 820 and the coil 830 generate driving force in the first axis (the Y-axis) direction. A distance between the magnet 820 and the aperture 810 in the first axis (the Y-axis)

direction may vary, when driving force is generated in the first axis (the Y-axis) direction by the magnet 820 and the coil 830.

The Hall sensor 840 may be fixedly disposed on the fourth surface of the substrate 600 to face the magnet 820. A magnetic flux value of the Hall sensor 840 may change in accordance with movement of the magnet 820. A position of the magnet 820 may be detected from the magnetic flux value of the Hall sensor 840.

Figure 3:
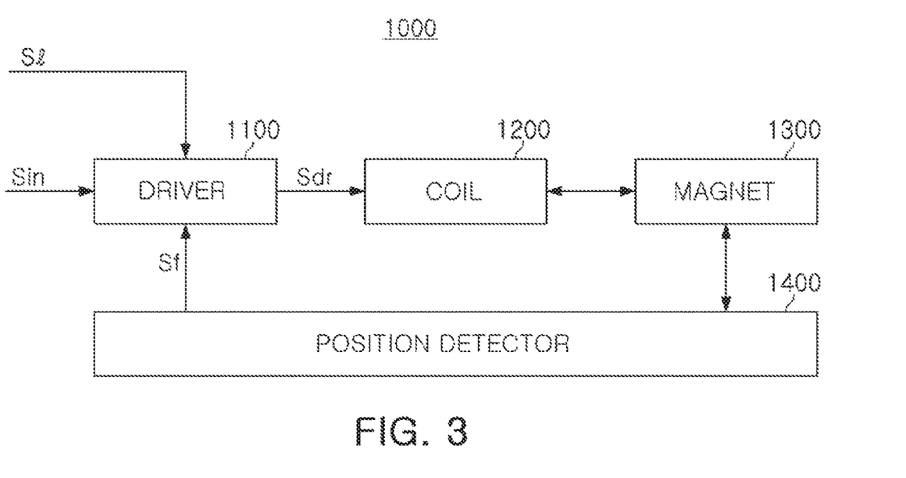
FIG. 3 is a block diagram of an aperture module employed in a camera module according to an example.

FIG. 3 is a block diagram of an aperture module employed in a camera module according to an example.

An aperture module 1000 may include a driver 1100, a coil 1200, a magnet 1300, and a position detector 1400.

The driver 1100 may generate a driving signal Sdr in accordance with an input signal Sin applied from an external source and a feedback signal Sf generated by the position detector 1400, and may supply the generated driving signal Sdr to the coil 1200. The input signal Sin may include information on a target position of the magnet 1300 corresponding to external illuminance information of a camera module. An amount of light passing through an aperture may be determined in accordance with the target position of the magnet 1300. The input signal Sin may be provided from an image processor that performs an image processing operation of an image signal generated by an image sensor. The input signal Sin may be provided from an illuminance sensor provided in the camera module.

An amount of light passing through the aperture may be determined by electromagnetic interaction between the coil 1200 and the magnet 1300, when a driving signal Sdr provided from the driver 1100 is applied to the coil 1200.

The position detector 1400 may generate a feedback signal Sf by detecting a position of the moving magnet 1300 using the electromagnetic interaction between the coil 1200 and the magnet 1300, and may output the feedback signal Sf to the driver 1100. For example, the position detection section 1400 may include a Hall sensor detecting a magnetic flux value. Assuming that the position detector 1400 is composed of a Hall sensor detecting a magnetic flux value, a magnetic flux value Δd of the Hall sensor may be determined, depending on a distance Δl between a magnet and a position detector, in accordance with the following Relationship 1. In Relationship 1, a refers to a constant.

$$\Delta d \propto \frac{a}{\Delta l^2} \qquad \text{Relationship 1}$$

When the feedback signal Sf is provided to the driver 1100, the driver 1100 may generate the driving signal Sdr by comparing the input signal Sin with the feedback signal Sf. For example, the driver 1100 may be driven in the form of a closed loop method that compares the input signal Sin with the feedback signal Sf. The driver 1100 may be driven in a manner that reduces an error between a target position of the magnet 1300 included in the input signal Sin and a current position of the magnet 1300 included in the feedback signal Sf. The driving operation using the closed loop method may have an advantage of improving linearity, accuracy, and repeatability as compared with those using an open loop method.

Figure 4:
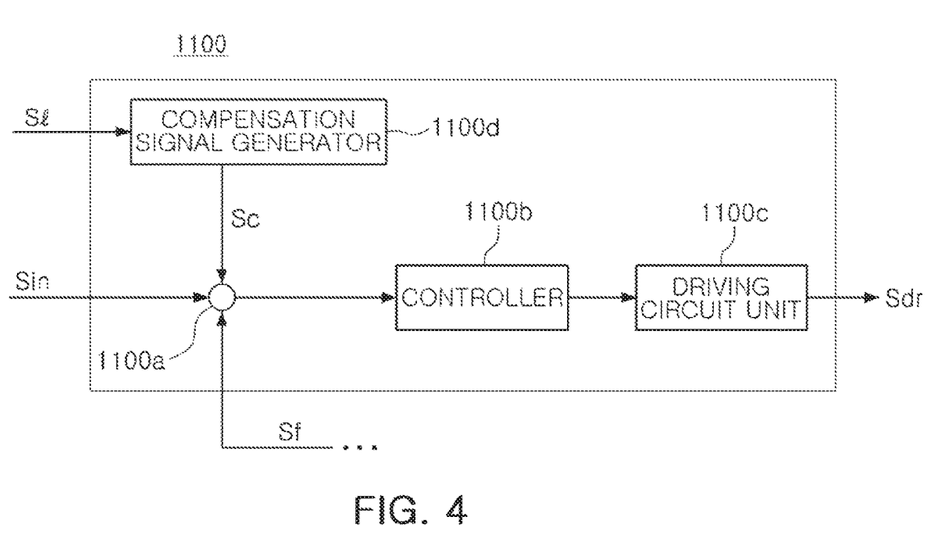
FIG. 4 is a block diagram of a driver of an aperture module according to an example.

FIG. 4 is a block diagram of a driver of an aperture module according to an example.

A driver 1100 may include a comparator 1100a, a controller 1100b, and a driving circuit unit 1100c.

The comparator 1100a may compare an input signal Sin with a feedback signal Sf. The comparator 1100a may calculate an error value by comparing a target position of a magnet 1300 included in the input signal Sin with a current position of a magnet 1300 included in the feedback signal Sf. Moving distance and direction of the magnet 1300 may be determined by the error value calculated by the comparator 1100a.

The controller 1100b may generate a control signal by applying a control gain to the error value provided from the comparator 1100a. The controller 1100b may include a proportional-integral-derivative (PID) controller to perform a PID control method. The controller 1100b may perform a control operation proportional to a magnitude of an error value in a current state according to a proportional control method, may perform a control operation to reduce an error in a steady state according to an integral control method, and may perform a control operation to prevent a sudden change and reduce overshoot according to a derivative control method.

The PID control method may be expressed by the following Relationship 2. In Relationship 2, $K_P$ denotes a proportional control gain, $K_I$ denotes an integral control gain, and $K_D$ denotes a derivative control gain.

$$u(t) = K_P e(t) + K_I \int e(t)dt + K_D \frac{de(t)}{dt} \qquad \text{Relationship 2}$$

The controller 1100b may generate a control signal by applying the proportional control gain $K_P$, the integral control gain $K_I$, and the derivative control gain $K_D$ to the error value, when performing the PID control method.

The driving circuit unit 1100c may generate a driving signal in accordance with a control signal provided from the controller 1100b. The magnet 1300 may be moved to the target position by the driving signal generated by the driving circuit unit 1100c. The driving circuit unit 1100c may include an H bridge circuit capable of bidirectional driving, and may apply a driving signal to the coil 1200 by a voice coil motor method. When the driving circuit unit 1100c is driven by a voice coil motor method, the control signal provided from the controller 1100b may be applied to a gate of a switching element constituting the H bridge circuit.

The aperture may be attached to the lens holder to which the lens barrel is fixedly inserted, and may move together with the lens barrel in a direction perpendicular to the optical axis. Therefore, when the aperture moves together with the lens barrel in a direction perpendicular to the optical axis, a distance between the magnet 1300 and the position detector 1400, provided on one side of the aperture, may be varied, and a position detection value of the position detector 1400 may be changed. For example, since a distance between the magnet 1300 and the position detector 1400 may be changed in accordance with movement of the lens barrel in a direction perpendicular to the optical axis, in addition to the driving signal provided to the coil 1200, and a compensation therefor may be required.

The driver 1000 may adopt a compensation signal generator 1100d to compensate for the change in the position detection value of the position detector in accordance with the movement of the lens barrel in a direction perpendicular to the optical axis.

The compensation signal generator 1100d may generate a compensation signal Sc in accordance with a position signal Sl indicating position information in a direction perpendicular to the optical axis of the lens barrel. The position signal Sl may be provided from a Hall sensor of an actuator employed in the camera module, or the position signal Sl may be provided from a gyro sensor which may be additionally adopted in the camera module.

The compensation signal generator 1100*d* may calculate a distance moving from a neutral position in the first axis (the Y-axis) direction and the second axis (the X-axis) direction, respectively, in accordance with position information of the lens barrel in to direction perpendicular to the optical axis. Specifically, the compensation signal generator 1100*d* compares a current position of the lens barrel with a neutral position of the lens barrel in a direction perpendicular to the optical axis, and may calculate distances moving in the first axis (the Y-axis) direction and the second axis (the X-axis) direction, respectively. Here, the neutral position means a position initially predetermined when no driving force is applied to the lens barrel.

The compensation signal generator 1100*d* may calculate a change in distance Δl of the magnet 1300 and the position detector 1400 from a distance moved in the first axis (the Y-axis) direction and the second axis (the X-axis) direction, respectively, in accordance with the following Relationship 3. In Relationship 3, Δx refers to a distance moved from the neutral position to the X axis, Δy refers to a distance moved from the neutral position to the Y axis, and b and c refer to constants or weights.

$$\Delta l^2 = b*\Delta x^2 + c*\Delta y^2 \qquad \text{Relationship 3}$$

The compensation signal generator 1100*d* may generate a compensation signal in accordance with the change in distance Δl of the magnet 1300 and the position detector 1400. The change in distance Δl of the magnet 1300 and the position detector 1400, for example, a change in distance Δl between a current position of the lens barrel and a neutral position of the lens barrel may be compensated by the compensation signal.

The compensation signal generator 1100*d* may provide the compensation signal Sc to the comparator 1110*a*. The comparator 1000*a* may calculate an error value by comparing the input signal Sin, the feedback signal Sf, and the compensation signal Sc.

The comparator 1110*a* may compensate for the feedback signal Sf indicating the current position of the magnet 1300 in accordance with the compensation signal Sc, and may compare the compensated feedback signal Sf with the input signal Sin.

The comparator 1110*a* may compensate for the input signal Sin indicating the target position of the magnet 1300 in accordance with the compensation signal Sc, and may compare the compensated feedback signal Sin with the feedback signal Sf.

The comparator 1110*a* may compensate for an error value by comparing the input signal Sin indicating the target position of the magnet 1300 with the feedback signal Sf indicating the current position of the magnet 1300 in accordance with the compensation signal Sc.

The aperture may be precisely controlled, irrespective of the displacement of the lens barrel, by varying the control value of the aperture according to the displacement of the lens barrel.

The examples provide an aperture module varying a control value of an aperture according to a displacement of a lens barrel, and a camera module including the same.

The controller 1100*b* in FIG. 4, for example, that performs the operations described in this application may be implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens barrel;
   an actuator configured to drive the lens barrel in a direction perpendicular to an optical axis of the lens barrel; and
   an aperture module configured to adjust an amount of light incident in the lens barrel,
   wherein the aperture module comprises an aperture coupled to the lens barrel, a magnet disposed on one side of the aperture, a coil disposed opposite to the magnet, a position detector configured to detect a position of the magnet and to generate a feedback signal, and a driver configured to compare an input signal indicating a target position of the magnet with the feedback signal, to calculate an error value, and to generate a driving signal based on the calculated error value, and
   wherein the driver is configured to compare a current position of the lens barrel with a neutral position of the lens barrel to generate a compensation signal and to compensate for one of the input signal and the feedback signal based on the compensation signal.

2. The camera module according to claim 1, wherein the driver is configured to compare the neutral position of the lens barrel with a respective position in a first direction perpendicular to the optical axis of the lens barrel and in a second direction perpendicular to the first direction.

3. The camera module according to claim 1, wherein the compensation signal compensates for a change in distance between the current position of the lens barrel and the neutral position of the lens barrel.

4. The camera module according to claim 1, wherein the magnet is configured to move together in accordance with driving of the lens barrel in a direction perpendicular to the optical axis of the lens barrel.

5. The camera module according to claim 4, wherein the position detector is fixedly disposed opposite to the magnet.

6. The camera module according to claim 1, wherein the actuator is configured to detect the current position of the lens barrel and to provide the detected current position of the lens barrel to the driver.

7. The camera module according to claim 1, further comprising a gyro sensor configured to detect the current position of the lens barrel,
   wherein the gyro sensor is configured to provide the detected current position of the lens barrel to the driver.

8. The camera module according to claim 1, further comprising an illuminance sensor configured to detect external illuminance,
   wherein the illuminance sensor is configured to generate the input signal based on the detected external illuminance.

9. An aperture module comprising:
   an aperture coupled to a lens barrel and configured to adjust light incident in the lens barrel;
   a magnet disposed on one side of the aperture;
   a coil disposed opposite to the magnet;
   a position detector configured to detect a position of the magnet and to generate a feedback signal; and
   a driver configured to supply a driving signal to the coil,
   wherein the driver is configured to:
      compare an input signal indicating a target position of the magnet with the feedback signal to calculate an error value,
      reflect a position of the lens barrel in a direction perpendicular to an optical axis based on the error value, and to
      generate the driving signal.

10. The aperture module according to claim 9, wherein the driver comprises:
    a comparator configured to compare the input signal with the feedback signal to calculate the error value;
    a controller configured to apply a control gain to the error value to generate a control signal;
    a driving circuit configured to generate the driving signal based on the control signal; and
    a compensation signal generator configured to generate a compensation signal based on a position signal indicating a position of the lens barrel in the direction perpendicular to an optical axis,
    wherein the comparator is configured to compensate for the error value based on the compensation signal.

11. The aperture module according to claim 10, wherein the controller comprises a proportional-integral-derivative (PID) controller.

12. The aperture module according to claim 11, wherein the driving circuit comprises an H bridge circuit connected to the coil.

13. The aperture module according to claim 12, wherein the H bridge circuit comprises a switching element and the control signal is provided to a gate of the switching element.

14. The aperture module according to claim 10, wherein the position signal is generated by an actuator configured to drive the lens barrel in the direction perpendicular to the optical axis.

15. The aperture module according to claim 10, wherein the position signal is provided from a gyro sensor of a camera module comprising the lens barrel.

16. The aperture module according to claim 9, wherein the magnet is configured to move together with driving of the lens barrel in the direction perpendicular to the optical axis, and the position detector is fixedly disposed opposite to the magnet.

17. A camera module comprising:
    a lens barrel comprising one or more lenses;
    an aperture coupled to the lens barrel and configured to adjust light incident in the lens barrel; and
    a driver configured to generate a driving signal for driving the lens barrel and the aperture based on an input signal, a position signal, and a feedback signal,
    wherein the driver is configured to:
       compare a current position of the lens barrel with a neutral position of the lens barrel to generate a compensation signal, and
       compensate for one of the input signal and the feedback signal based on the compensation signal.

18. The camera module of claim 17, further comprising an image processor configured to perform an image processing operation on an image signal generated by an image sensor and to provide the processed image signal to the driver as the input signal.

19. The camera module of claim 17, further comprising a coil, a magnet, and a position detector configured to generate the feedback signal by detecting a position of the magnet based on an electromagnetic interaction between the coil and the magnet and to output the feedback signal to the driver.

20. The camera module of claim 17, further comprising a sensor configured to generate the position signal based on position information of the lens barrel with respect to a direction perpendicular to an optical axis of the lens barrel and to output the position signal to the driver.

* * * * *